United States Patent [19]

Kempe

[11] 4,309,688
[45] Jan. 5, 1982

[54] MEASURING SENSOR

[75] Inventor: Wolfgang Kempe, Mörfelden-Walldorf, Fed. Rep. of Germany

[73] Assignee: Licentia Patent-Verwaltungs G.m.b.H., Frankfurt am Main, Fed. Rep. of Germany

[21] Appl. No.: 137,009

[22] Filed: Apr. 3, 1980

[30] Foreign Application Priority Data

Apr. 3, 1979 [DE] Fed. Rep. of Germany ....... 2913279

[51] Int. Cl.³ .......................................... H01C 3/04
[52] U.S. Cl. ................................. 338/25; 204/195 S
[58] Field of Search ................ 338/20, 25, 23, 22 R, 338/225 D, 28; 73/27, 362 AR; 340/584; 204/195 S; 313/14; 323/68, 69; 236/91 F, 99 E, 101 B

[56] References Cited

U.S. PATENT DOCUMENTS

| 2,977,558 | 3/1961 | Hampton. | |
|---|---|---|---|
| 2,996,696 | 8/1961 | Harman. | |
| 3,216,911 | 11/1965 | Kronenberg | 204/1 S |
| 3,843,400 | 10/1974 | Radford, et al. | 204/195 S |
| 4,111,777 | 9/1978 | Dobson | 204/195 S X |

*Primary Examiner*—C. L. Albritton
*Attorney, Agent, or Firm*—Spencer & Kaye

[57] ABSTRACT

A measuring sensor having a temperature-dependent conductivity and composed of a shaped body of a solid electrolyte material exhibiting such temperature-dependent conductivity, and two contact layers sintered onto the body and arranged for connection to circuit conductors.

5 Claims, 3 Drawing Figures

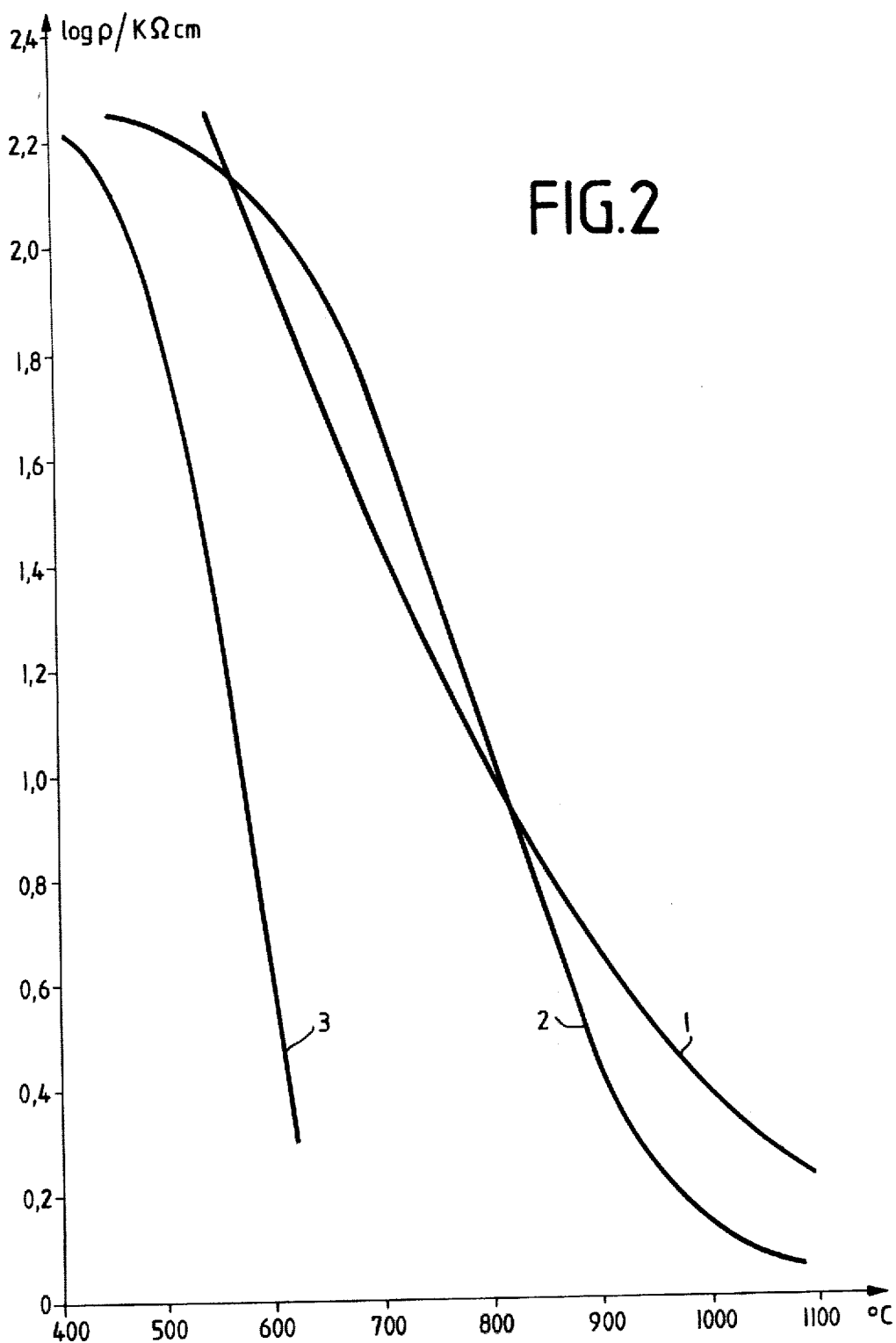

MEASURING SENSOR

BACKGROUND OF THE INVENTION

The present invention relates to a measuring sensor having a temperature dependent conductivity, which controls or regulates a heating circuit.

In the heating art there exists the desire to be able to measure, control and regulate temperatures in a range from about 500° to 1000° C. without too much apparatus and expense.

With electrically operated heat storage furnaces employing heat storage bricks, the temperature of such bricks should be kept constant, for example, between 800° and 950° C. It is known to use liquid or rod expansion regulators to keep such high temperatures constant. The switching members of such regulators are designed only for temperatures between about 350° and 500° C. so that they must be arranged at a certain distance from the storage bricks, which results in structural drawbacks. The technical expenditures for such switches is also considerable.

SUMMARY OF THE INVENTION

It is an object of the present invention to provide a measuring sensor which can be associated directly with the heat source in question and operates reliably over long periods of time with minimal technical expenditures.

A particular advantage offered by the present invention is that the prior art bulky switching members, and thus structural limitations, are eliminated. The required technical expenditures are very low, and the electrical connection of the measuring sensor in the control or regulating circuit is nevertheless absolutely reliable.

BRIEF DESCRIPTION OF THE DRAWING

FIG. 2 is a diagram showing the temperature dependence of the specific resistance of the measuring sensor employed.

DESCRIPTION OF THE PREFERRED EMBODIMENTS

Figure 1:
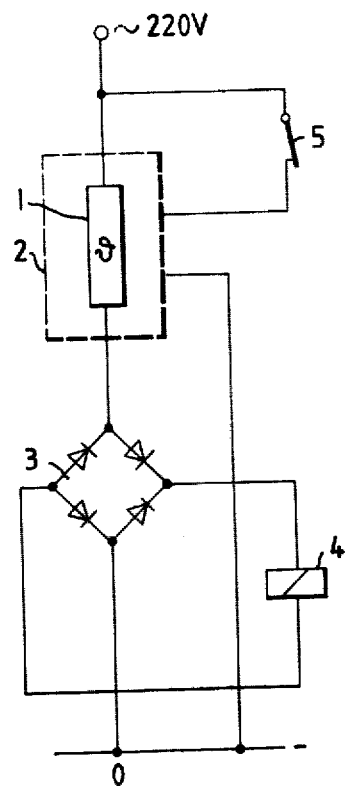
FIG. 1 is a diagram of a control circuit for an electrical furnace.

As can be seen in FIG. 1, a measuring sensor 1 is arranged directly in a furnace 2, which may be of the heat storage brick type. The measuring sensor 1 is connected in series with a rectifier 3 the d.c. terminals of which are connected to a relay 4 provided with a switching contact 5. Measuring sensor 1 and rectifier 3 are connected across an alternating voltage of 220 V. The switching contact 5 lies in the 220 V supply circuit for the furnace 2.

In the starting position of this control circuit, the switching contact 5 of the relay 4 is closed so that the furnace 2 is heated. With rising temperature in the furnace 2, the specific resistance, or resistivity, of the measuring sensor 1 which is made of a solid electrolyte material, changes, as can be seen in the diagram of FIG. 2 to be described in detail below, the resistance becoming lower, and at a certain level of the direct current through the relay 4, the latter responds, the switching contact 5 opens and the supply of heating energy to furnace 2 is switched off. The temperature in the furnace 2 will then drop and the resistance of the measuring sensor 1 will rise correspondingly. With a certain level of current through rectifier 3, the relay 4 will become deactuated so that the switching contact 5 will close again and the furnace is heated again, etc.

Ion conductors or electron semiconductors whose conductivity can be changed by suitable additives are suitable as measuring sensors. One of these groups of material includes doped higher valent metal oxides, such as for example $ZrO_2$, $TiO_2$, $Al_2O_3$ etc.

Low valent metal oxides, such as, for example, MgO, CaO, $Na_2O$, etc. are embedded in these oxides.

The proportion of embedded oxides produces a corresponding number of oxygen holes which determine conductivity. Salts and salt mixtures which experience a reversible conversion with change in conductivity in a temperature range between about 500° and 1000° C. can also be used as additives.

These ion conductors are not adversely influenced by charging and discharging processes when an alternating voltage (220 V) is applied.

The ceramic bodies can be produced by a sintering and pressing process. The diffusion of low valent oxides is based, for example, on the decomposition of carbonates:

$$MCO_3 \rightleftharpoons MO + CO_2$$

where M=Ca, Mg etc.

For earth alkali carbonates the most favorable diffusion temperatures lie at about 1600° C.

For the alkali carbonates, the sublimation of the oxides must be considered, and the temperature load here lies between 100° and 1200° C.

FIG. 2 shows the temperature dependent resistance behaviour of several solid electrolyte materials. The curves relate to body shapes having a cross section of about 0.6 to 1.0 cm² and a length of about 1.5 to 3.0 cm.

Curve 1 represents a body made of pure $ZrO_2$, curve 2 a body of $ZrO_2$ and 2.8% CaO, and curve 3 a body of $ZrO_2$ with 5.6% CaO. As can be seen, these bodies can be used within a range from about 500° to 1000° C.

Figure 3:
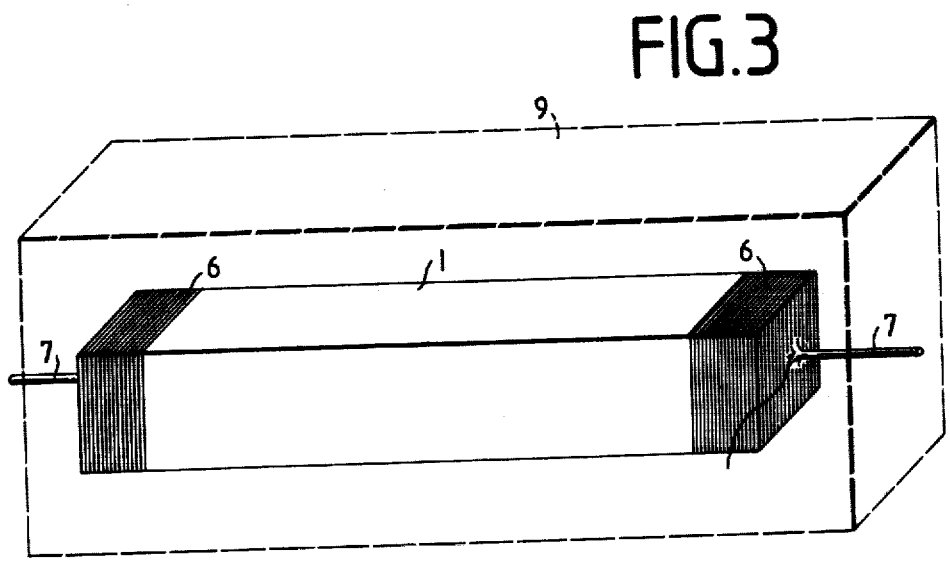
FIG. 3 is a perspective view of a preferred embodiment of a measuring sensor according to the invention with its contact layers and electrical connections.

FIG. 3 shows details of the body of the measuring sensor 1 made of a solid electrolyte material with contacting layers 6 and welded-on electrical conductors 7. The above-mentioned arrangement is embedded in a cast mass 9 which simultaneously serves to mechanically relieve the stresses on the electrical conductors.

It is to be understood that the above description of the present invention is susceptible to various modifications, changes and adaptations, and the same are intended to be comprehended within the range and meaning of equivalents of the appended claims.

What is claimed is:

1. An electrical resistance temperature sensor for regulating a heating circuit, comprising a shaped body of a solid electrolyte material exhibiting a temperature dependent conductivity and constructed to be exposed on all sides of the temperature to be sensed, and two contact layers of iron oxide material sintered onto said body and arranged for connection to conductors for the heating circuit.

2. A sensor as defined in claim 1 wherein said body and said contact layers are produced in a common sintering process and are thus connected together.

3. A sensor as defined in claim 1 wherein said contact layers consist of a mixture of iron oxide and zirconium dioxide material.

4. A sensor as defined in claim 1 further comprising an electrical conductor of a control circuit welded to each said contact layer.

5. A sensor as defined in claim 4 wherein sensor including the contacting layers and the electrical conductors are embedded in a cast mass as sections of the control circuit.

* * * * *